United States Patent [19]

Puskas

[11] Patent Number: 4,470,567
[45] Date of Patent: Sep. 11, 1984

[54] GLIDING AIRFOIL PARACHUTE CANOPY CONSTRUCTION

[75] Inventor: Elek Puskas, Mount Holly, N.J.

[73] Assignee: Para-Flite, Inc., Pennsauken, N.J.

[21] Appl. No.: 399,889

[22] Filed: Jul. 19, 1982

Related U.S. Application Data

[63] Continuation of Ser. No. 189,750, Sep. 23, 1980, abandoned.

[51] Int. Cl.$^3$ .............................................. B64D 17/02
[52] U.S. Cl. ................................................. 244/145
[58] Field of Search ............... 244/142, 145, 152, 146, 244/DIG. 1; D12/321

[56] References Cited

U.S. PATENT DOCUMENTS

| | | | |
|---|---|---|---|
| 3,228,635 | 1/1966 | Hughes et al. | 244/145 |
| 3,285,546 | 11/1966 | Jalbert | 244/145 |
| 3,350,040 | 10/1967 | Sims et al. | 244/145 |
| 3,558,087 | 1/1971 | Barish | 244/142 |
| 3,724,789 | 4/1973 | Snyder | D12/321 |
| 3,809,342 | 5/1974 | Lemoigne | 244/145 |
| 3,830,512 | 8/1974 | Spiegel | 244/DIG. 1 |
| 3,995,799 | 12/1976 | Bartolini | D12/321 |
| 4,191,349 | 3/1980 | Pravaz | 244/DIG. 1 |

FOREIGN PATENT DOCUMENTS 1570286  6/1969  France ............................ 244/145

Primary Examiner—Galen L. Barefoot
Attorney, Agent, or Firm—Harvey B. Jacobson

[57] ABSTRACT

The outer airfoil surface portions of a forward gliding type parachute canopy are made from one-piece flexible panels secured to each other along seams extending in transverse intersecting relation to the seams connecting spaced ribs to the outer surface portions to form internal airflow channels. Each panel is substantially equal in length to the spanwise dimension of the canopy.

5 Claims, 3 Drawing Figures

GLIDING AIRFOIL PARACHUTE CANOPY CONSTRUCTION

This application is a continuation of application Ser. No. 189,750, filed Sept. 23, 1980, now abandoned.

BACKGROUND OF THE INVENTION

This invention relates generally to forward glide types of parachute canopies of the ram air type which are inflated to an airfoil shape, such as shown in prior U.S. Pat. No. Re. 26,427 and U.S. Pat. Nos. 3,524,613, 3,724,789, and 4,015,801 which include an upper surface, a bottom surface and a series of ribs extending therebetween to divide the parachute into cells, and more particularly to construction of such parachute canopies.

Parachute canopies of the foregoing type have been made for many years from a minimum of five to seven elongated flexible panels sewn to each other along chordwise seams extending between leading and trailing edges of the canopy. The panels for each the bottom and top surfaces have been dimensioned in length substantially equal to the chordwise dimensions of the canopy and have been cut to an appropriate width so that the seams between panels will coincide with chordwise seams at which the ribs are connected to the airfoil surface portions. Such a constructional arrangement was heretofore deemed necessary by persons skilled in the art so as to form a canopy with optimum stress distribution under forces experienced by ram air inflated, gliding airfoil canopies.

It is therefore an important object of the present invention to provide a more efficient constructional arrangement for canopies of the aforementioned type whereby the amount of wasted material, the number of seams and material cutting operations may be reduced.

SUMMARY OF THE INVENTION

The foregoing objectives have been achieved unexpectedly through use of a constructional arrangement for canopies of the ram air inflated airfoil-shaped type that is different from the basic arrangement heretofore utilized in that the outer airfoil surface portions, upper and lower are both formed from elongated flexible panels sewn to each other along seams extending spanwise in transverse intersecting relation to the seams connecting the spaced internal ribs to the outer airfoil surfaces. The uninterrupted lengths of the panels are therefore substantially equal to the spanwise dimensions of the canopy and the side edges of the panels sewn to each other need not be cut or located in any particular relationship to the rib seams as in the case of prior art constructions. As a result of this arrangements, a reduction in the number of panels necessary to form each airfoil surface may thereby be realized as well as a reduction in the number of cells, thus reducing the number of ribs and chordwise seams necessary to assemble the parachute.

The concept of merely arranging continuous flexible panels lengthwise in a spanwise direction for hemispherical canopies is already known, as shown in U.S. Pat. No. 2,959,385 and for small sail wing canopies as shown in U.S. Pat. No. 3,830,512. However, significantly different stress distributions and manufacturing problems are associated with hemispherical and sail wing canopies as compared to ram air canopies. Further, none of such hemispherical or sail wing canopies have airflow channel dividing ribs associated therewith that heretofore dictated an arrangement of panels with chordwise extending seams therebetween. Accordingly, the advantages resulting from the spanwise arrangement of panels in accordance with the present invention, were not applicable to hemispherical and small sail wing canopies.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF PREFERRED EMBODIMENT

Figure 1:
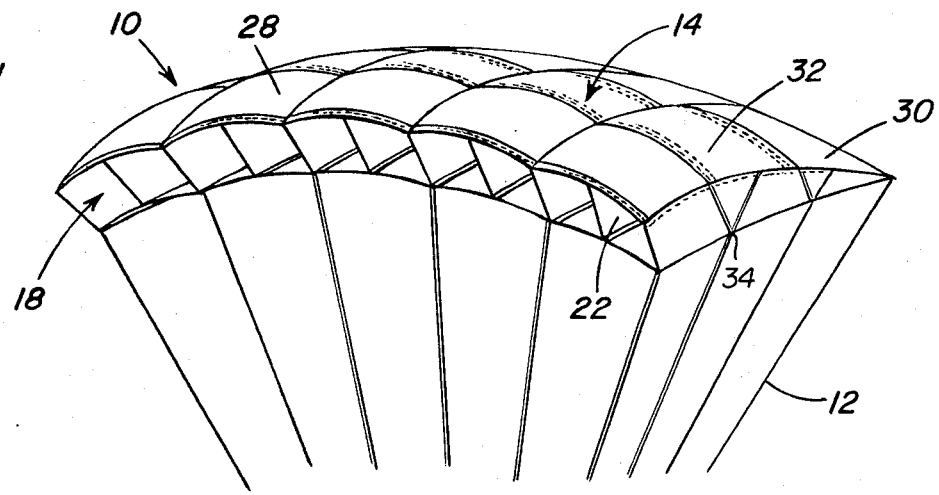
FIG. 1 is a perspective view of a parachute canopy constructed in accordance with the present invention.
Figure 2:
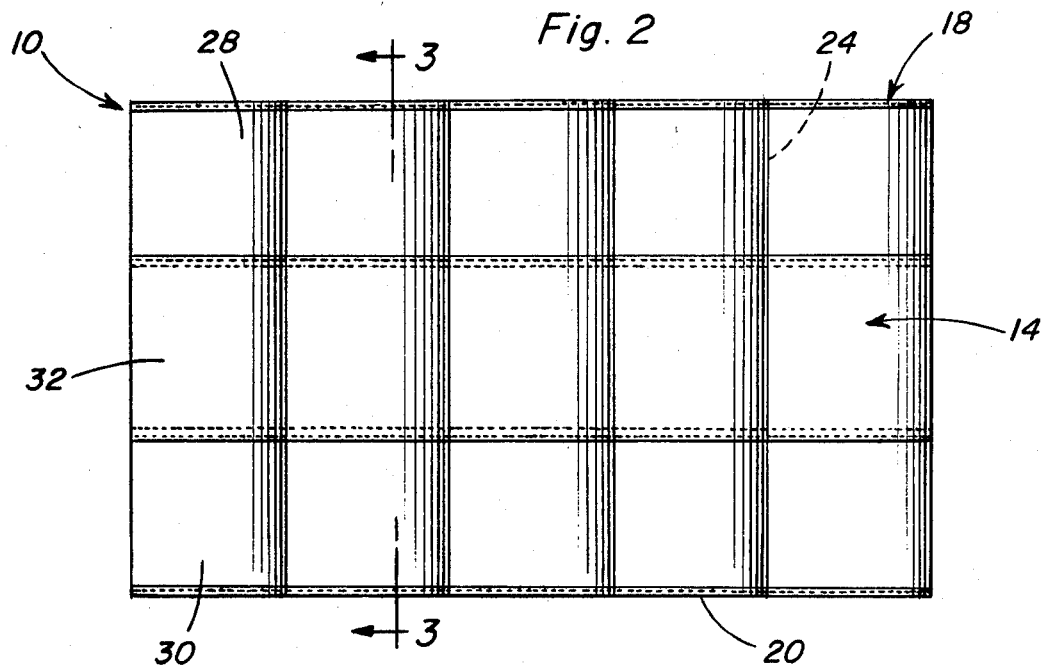
FIG. 2 is a top plan view of the canopy shown in FIG. 1.
Figure 3:
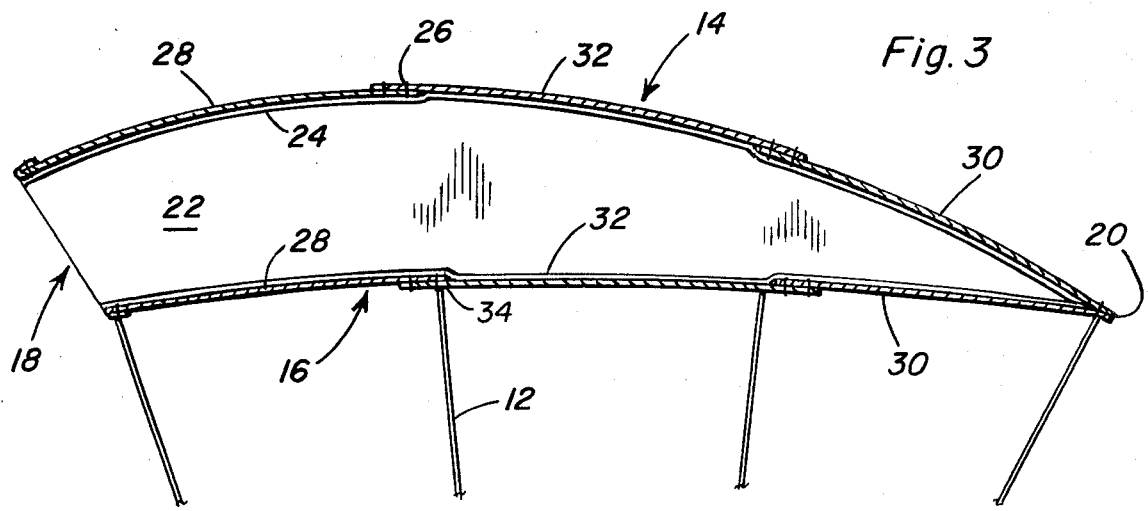
FIG. 3 is a section view taken substantially through a plane indicated by section line 3—3 in FIG. 2.

Referring now to the drawings in detail, a ram air type of airfoil shaped parachute canopy is shown generally referred to by reference numeral 10. The canopy is connected during deployment to a payload (not shown) by means of suspension lines 12. In this type of parachute, the canopy is inflated to and maintained in an airfoil shape by means of a ram air effect during forward glide descent.

In the illustrated embodiment, the canopy 10 includes an outer airfoil surface formed by an upper flexible skin generally denoted as 14 and a bottom surface 16 from which the suspension lines extend. Such outer surface portions 14 and 16 are usually made of a flexible material or fabric extending lengthwise from a leading edge portion 18 to a trailing edge portion 20. When inflated, the outer surface portions of the canopy are held spaced apart by spanwise spaced ribs 22 secured to the outer surface portion along chordwise extending seams 24 which form pressure cells or airflow channels in the canopy between the upper surface 14 and bottom surface 16.

Heretofore, the outer surface portions of the canopy were always made from a minimum of five to seven flexible panels of fabric cut from a bolt of cloth, laid in the chordwise direction and sewn to each other along chordwise extending seams. In contrast, in the arrangement of the present invention flexible elongated panels are sewn to each other along spanwise extending seams 26 in transverse intersecting relation to the chordwise extending ribs 22 and seams 24. Three panels consisting of end panels 28 and 30 and intermediate panel 32 are utilized to form each of the outer surface portions 14 and 16. Each of the panels 28, 30 and 38 therefore has an uninterrupted length that is substantially equal to the spanwise dimension of the canopy, with the sides of adjacent panels secured to each other along the spanwise extending seams 26. Further, it will be observed that both outer surface portions have at least two transverse seams which intersect substantially perpendicularly to the chordwise seams 24 thus significantly increasing the strength and integrity of the overall canopy.

The unattached sides of the end panels 28 and 30 form the leading and trailing edge portions of the canopy.

The unattached sides of the end panels 28 respectively associated with the upper skin 14 and bottom sheet 16 also define the inlet opening at the leading edge portion through which inflow of air is conducted into the pressure cells or airflow channels between the ribs 22 causing inflation of the canopy to the airfoil shape shown. The ribs 22 may be located in spaced relation to each other wherever desired without regard to the location of the connecting seams 26 between the panels because of the transverse intersecting relationship between seams 24 and 26. Hence, the ribs can be positioned where best suited for the performance of the canopy.

The suspension lines 12 are attached to the bottom surface 16 at or near the point of transverse intersection between the chordwise rib seams 24 and the spanwise connecting seams 26, where stress distributing tapes extend upwardly, as at 34. By such point of attachment, the load from the suspension lines is introduced into the canopy at reinforcing intersecting seams and transmitted to the top surface through the tapes, as described in U.S. Pat. No. 3,724,789.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A gliding airfoil parachute canopy having a generally rectangular configuration with generally parallel leading and trailing edges and side edges extending between the leading and trailing edges, said canopy comprising a plurality of panels of flexible material of one-piece construction extending continuously spanwise of the canopy, seams continuously securing the trailing edge of a leading spanwise panel to the leading edge of a trailing spanwise panel, a plurality of chordwise ribs on the canopy extending from leading edge to trailing edge of the canopy, said continuous spanwise panels enabling the ribs to be located anywhere along the span of the panel to form cells extending from leading edge to trailing edge of the canopy thereby enabling the cell width to be determined by design characteristics rather than the width of the bolt of material as required in canopies having panels extending from leading edge to trailing edge secured together by chordwise seams.

2. A ram air inflated parachute having an airfoil shape and made of material which comprises:
    an upper surface, a lower surface and spaced apart ribs sewn to and extending between the upper surface and the lower surface to divide the canopy into a series of chordwise extending cells for inflation by ram air pressure whereby the ribs are connected to the upper surface and the lower surface by a series of first interconnecting seams;
    said upper surface and said lower surface each constructed of at least two elongated panels sewn continuously along adjacent elongated edges by one or more second interconnecting seams; and
    said elongated panels extending the full spanwise width of the parachute and substantially perpendicular to said ribs whereby said first interconnecting seams intersect said second interconnecting seams substantially at right angles to each other whereby the fabric in the upper and lower surfaces is divided into sections by said interconnecting seams.

3. The combination of claim 2 and including suspension lines for attaching a load connected to said lower surface at the approximate intersection between said first interconnecting seams and said second interconnecting seams.

4. The combination of claim 2 wherein said elongated panels are formed of uninterrupted fabric and extend the full spanwise width of the upper surface and the lower surface.

5. The combination of claim 2 and including reinforcing means attached to the ribs and extending from the lower surface to the upper surface;
    said reinforcing means being attached to the lower surface approximately at the intersection between said first interconnecting seams and said second interconnecting seams.

* * * * *